United States Patent [19]

Mukaida et al.

[11] Patent Number: 5,435,842
[45] Date of Patent: Jul. 25, 1995

[54] VIBRATION DAMPING THICK-FILM COATING COMPOSITION AND METHOD OF FORMING THE COATED FILM

[75] Inventors: Heihachiro Mukaida; Takashi Hemmi; Seiichi Takano; Yoshiyuki Hattori, all of Saitama, Japan

[73] Assignees: Cosmo Research Institute; Cosmo Oil Co., Ltd., both of Tokyo, Japan

[21] Appl. No.: 947,756

[22] Filed: Aug. 11, 1992

[30] Foreign Application Priority Data

Aug. 12, 1991 [JP] Japan .................. 3-226468
Jun. 4, 1992 [JP] Japan .................. 4-170157
Jun. 4, 1992 [JP] Japan .................. 4-170158

[51] Int. Cl.$^6$ .............................................. C04B 14/00
[52] U.S. Cl. ............................ 106/672; 106/681;
  106/711; 106/724; 106/773; 106/778; 106/780;
  106/788; 106/790; 106/794; 106/803; 106/805;
  106/705; 106/708; 106/DIG. 7; 524/442
[58] Field of Search ............... 106/672, 695, 711, 718,
  106/724, 738, 803, 811, 281.1, 282, DIG. 7, 681,
  790, 773, 778, 780, 788, 794, 805, 705, 708;
  252/62; 524/442

[56] References Cited

U.S. PATENT DOCUMENTS

| | | | |
|---|---|---|---|
| 2,178,770 | 11/1939 | Zaisser | 106/282 |
| 4,002,590 | 1/1977 | Yoshida et al. | 524/442 |
| 4,746,365 | 5/1988 | Babcock et al. | 106/695 |
| 4,838,939 | 6/1989 | Kanda et al. | 106/DIG. 7 |

FOREIGN PATENT DOCUMENTS

0026388 4/1981 European Pat. Off. .
525638 9/1940 United Kingdom .
WO-A-8202709 8/1982 WIPO .

OTHER PUBLICATIONS

Patent Abstracts of Japan; vol. 12, No. 96 (C-484) (2943) 29 Mar. 1988; which is of JP-A-62 227 966 (Nissan Motor Co) 6 Oct. 1987 *abstract*.
WPIL AN 88-230541; Week 8833, 12 Oct. 1988; Derwent Publications Ltd., London, GB; which is of JP-A-63 162 770 (Dainippon) 6 Jul. 1988 *abstract*.
WPI AN 77-58328; Derwent Publications Ltd., London, GB; which is of JP-A-52 078 931 (Toyo Kogyo and Hirota) 2 Jul. 1977 *abstract*.
WPIL AN 88-230401; Derwent Publications Ltd., London, GB; which is of JP-A-63 162 564 (Dainippon) 6 Jul. 1988 *abstract*.

*Primary Examiner*—Karl Group
*Assistant Examiner*—Michael Marcheschi
*Attorney, Agent, or Firm*—Sughrue, Mion, Zinn, Macpeak & Seas

[57] ABSTRACT

Vibration damping thick-film coating composition comprising a coating composition comprising 100 parts by weight of a binder, from 20 to 200 parts by weight of a hydraulic inorganic filler, from 10 to 150 parts by weight of a filler other than the hydraulic inorganic filler, and from 10 to 7 parts by weight of (a) a cored filler or (b) a cored filler and a synthetic resin powder, and a method of forming the same.

16 Claims, No Drawings

VIBRATION DAMPING THICK-FILM COATING COMPOSITION AND METHOD OF FORMING THE COATED FILM

FIELD OF THE INVENTION

The present invention relates to a coating composition which is light in weight, forms a good coated film or layer having better adhesion than conventional vibration damping thick-film coating compositions and which does not undergo blistering even when the coated film is dried by heating, has an excellent vibration damping property when the coating composition is applied to a substrate such as a steel article (e.g., a car, a washing machine, and various other substrates), various other kinds of metal articles, synthetic resin plates, etc., and which can be applied as a thickfilm.

The present invention also relates to a method of forming a coated film or layer using the foregoing coating composition.

BACKGROUND OF THE INVENTION

Hitherto, as a vibration damping material for substrates such as steel articles for cars, washing machines, and various other kinds of substrates, various kinds of metal articles, synthetic resin plates, etc., a sheet-form material has generally been used and such a sheet-form material has been applied to the base plate by fusion welding. However, since, for example, the floor of a car, etc., usually has a complicated form, it is difficult to coat the whole surface of the floor and there is the difficulty that a partial inferior adhesion occurs at portions which have not been welded, whereby a sufficient vibration damping property is not obtained.

It is necessary that a vibration damping material for the interior of a car has sufficient fluidity at coating for increasing the working efficiency of the automation of a process line and also has the property of not sagging even in the case of applying a thick coating of about 5 mm. Further, it is required that the vibration damping material has good adhesion to substrates such as steel plates, etc., even under severe vibration or shock, and also is light in weight.

As a method of solving such problems, a method of coating a vibration ,damping material having a filler has been proposed as described, e.g., in JP-A-55-58262 (the term "JP-A" as used herein means an "unexamined published Japanese patent application"). Also, the inventors preciously provided a vibration damping coated film-forming material excellent in adhesion, working properties, and vibration damping property, as described in JP-A-62-227966.

However, such conventional vibration damping coated film-forming materials have disadvantages in the points of adhesion, working properties, etc.

Further, recently, the development of a vibration damping coated film-forming material having a lower specific gravity (i.e., which is light in weight) has been desired.

A coating composition is typically a mixture of various fillers, a high molecular weight resinous material and an organic solvent as a diluent and such a coating composition is coated on a material using various kinds of coating methods.

The organic solvent as a diluent normally has high volatility, creates the danger of fire, and has high toxicity, whereby the organic solvent cause the problem of environmental pollution upon volatilizing the same.

Thus, recently, water base coating compositions using water in place of an organic solvent have been developed.

Water base coating compositions are generally classified into emulsion coating compositions (aqueous dispersion coating compositions) and water-soluble resin coating compositions. In these coating compositions, no organic solvent is used as a diluent or if an organic solvent is used, the amount thereof is very low.

To shorten the drying time of a water base coating composition as described above, drying with a hot air stream of a temperature of about 100° C. is generally employed. The foregoing film-forming coating composition previously proposed by the inventors herein is coated and dried with an air stream in the temperature range of from room temperature to 180° C.

However, the foregoing coating composition previously proposed by the inventors herein is subject to the following problem.

At a relatively high drying temperature of higher than 60° C. for a coated film or layer formed using the foregoing coating composition (practically, in the temperature range of from room temperature to 180° C.), sometimes the coated film formed by coating the coating composition blisters and it is difficult to always obtain a good coated film or layer.

The reason for this is considered to be as follows. When the coated film is dried at a temperature higher than 60° C. and, in particular, when the thickness of the coated layer is thicker than that formed using a conventional coating composition, drying of the coated film occurs from the surface thereof and water confined in the interior of the coated film expands without being evaporated to cause blistering in the coated film.

When blistering occurs on the surface of the coated film or layer, not only is the appearance of the film or layer spoiled, but also the performance required for the coated film, such as a vibration damping property, adhesion, etc., is not sufficiently obtained, which results in a lowering of the commercial value of the coated article.

Accordingly, it is necessary to dry such a coated film at a relatively low temperature of not higher than 60° C. or to reduce the thickness of the coated film.

However, in the case of drying at a low temperature, the coating procedure is prolonged, which reduces the efficiency of the production step for the product.

In the case of forming a thin coated film, there are restrictions on the use of such a thin film or layer. Also, if a desired greater thickness of the coated film is required, the steps of coating a thin coated film and drying and then further coating another thin coated film followed by drying must be repeated several times, which results in prolonging the coating procedure and further causing the problem of peeling of each coated film.

SUMMARY OF THE INVENTION

The present invention was reached in consideration of the above-described circumstances.

The first object of the present invention is to provide a coating composition which is excellent in workability, adhesion, and vibration damping properties and which is light in weight, different from a conventional vibration damping coating material of the weight dependant type which uses a high specific gravity filler such as a metal powder, etc.

The second object of the present invention is to provide a coating composition which can be dried without problem, even when the thickness of the coated film is high, under severe drying conditions at a relatively high temperature and a relatively high drying air velocity in addition to the advantages of the foregoing first object.

As a result of research to achieve the foregoing objects, the inventors discovered that by mixing a specific binder with a hydraulic inorganic filler, another filler, and a cored filler or a cored filler and a synthetic resin powder at specific ratios, a coating composition (1) of being light in weight (low specific gravity of about 0.5 to 1.2) and which is excellent in workability, adhesion, and the vibration damping properties as compared with conventional vibration damping coating compositions can be obtained. Further, by adding a fibrous material to coating composition (1) [coating composition (2)], or by mixing a definite ratio of a gas into coating composition (1) or (2) [coating composition (3)] not only having the advantages of coating composition (1) but which is also capable of forming a coated film of considerably thickness without blistering under relatively severe drying conditions can be obtained. The inventors succeeded in reaching the present invention based on the above discoveries.

DETAILED DESCRIPTION OF THE INVENTION

The present invention is now described in detail.

The binder which can be used in the coating composition of the present invention is generally composed of an asphalt, a rubber, and/or a synthetic resin. As the asphalt, there are petroleum series asphalts (e.g., straight asphalts: penetration of 60–80, softening point of 44.0°–52.0° C.) and natural asphalts (penetration of 0, softening point of 157°–166° C.), as the rubber, there are butadiene rubbers, isoprene rubbers, styrene-butadiene rubbers, chloroprene rubbers, butadiene-acrylonitrile rubbers, etc., and as the synthetic resin, there are an alkyd resins, epoxy resins, acrylic resins, melamine resins, urethane resins, acrylic copolymer resins, vinyl acetate copolymer resins, styrene-vinyl acetate copolymer resins, vinyl chloride resins, etc.

However, to achieve high adhesion to substrates and high chemical resistance and water resistance for the coated film, it is preferable that the binder used for the coating composition of the present invention be composed of asphalt, an acrylic resin, etc.

In this case, the ratio of the asphalt to the acrylic resin is from 4/1 to ½, preferably from 3/1 to ½, and more preferably from 2/1 to 1/1 by volume. If the content of the acrylic acid is too high, the coated film is liable to blister, while if the content thereof is too low, adhesion of the coated film to a substrate is lowered and the viscosity of the coating composition is increased to reduce the workability thereof.

The foregoing binder is used as an aqueous system by dispersion in water or is emulsified with water, or is used as a solution thereof in a solvent such as an aromatic hydrocarbon series solvent (e.g., benzene, toluene), a petroleum hydrocarbon series solvent (e.g., mineral spirit, gas oil), an alcoholic solvent, an ester series solvent, etc., but from the viewpoint of an environmental preservation, an aqueous system is generally preferable. The amount of the binder ranges from 30 to 70% by weight based on the binder and water or organic solvent.

As the hydraulic inorganic filler used for the coating composition of the present invention, an aging slag, cement (e.g., portland cement, alumina cement), gypsum, lime, etc., can be used owing to their hydraulic property and, in particular, a hydraulic inorganic filler mainly (60 to 100 wt %) composed of an aging slag is preferred due to the characteristics of the aging slag now described.

In the case of using an aging slag in a mixture with another hydraulic inorganic filler, it is preferred that the mixing ratio of the aging slag is at least about 80% by weight based on the total amount of the whole hydraulic inorganic fillers for effecting the advantages of the aging slag.

An aging slag is composed of, for example, 40% by weight calcium oxide, 33% by weight silicic acid, 17% by weight aluminum oxide, 6% by weight magnesium oxide, and 4% by weight of iron oxide. Aging slag itself does not have any hydraulic property or even if the slag has a hydraulic property, it is very low. However, under the existance of calcium hydrate or alkaline salts, etc., in aging slag, the network structure constituting the glassy texture of the slag collapses, and then it forms a hydration product which can be hardened by coagulation. This property is called a latent hydraulic property.

The latent hydraulic property of aging slag is too weak to reduce the fluidity of the coating composition but the addition of a small amount (8–20 wt %) of cement, etc., has the effect of not only inhibiting the occurrence of sagging of the coated film on coating but also quickening the drying speed of the coated film.

Aging slag is obtained by aging slag which is by-produced in a smelting furnace such as a converter, a blast furnace, etc., and which has a proper density (3–4 $g/cm^3$) .

The cored filler which is used for the coating composition of the present invention is a fine hollow particles. Practically, there are glass balloons, siras (a kind of volcanic ash) balloons, synthetic resin balloons, etc. There is no particular restriction on the characteristics thereof, but it is generally preferred that the bulk density thereof be from about 0.1 to 0.3 $g/cm^3$ and the particle size thereof is about 10 to 300 $\mu m$.

If the bulk density of the cored filler is less than about 0.1 $g/cm^3$ the strength of the foam is weakened by the increase of the particle size, whereby there is the possibility that the cored filler will be broken during the preparation of the material. Also, if the bulk density thereof is larger than about 0.3 $g/cm^3$ the desired light weight of the coating composition is greatly reduced.

If the particle size of the cored filler is less than about 10 $\mu m$, the density of the material becomes high, whereby the desired light weight cannot be obtained, while if the particle size thereof is larger than about 300 $\mu m$, the specific gravity thereof becomes too small, so that the cored filler floats on the upper part of the coating composition to reduce the storage stability thereof. Also, there is no problem when the coating composition is coated by a method other than spray coating (hand coating, etc.), but when the coating composition is spray coated, cored filler having such a large particle size clog the spray tip to reduce workability.

If desired, a part of the foregoing cored filler may be replaced with a synthetic resin powder.

As such a synthetic resin powder, there are thermosetting resin powders or thermoplastic resin powders, such as alkyd resins, epoxy resins, silicone resins, phenol resins, polyester resins, acrylic resins, acetal resins, polyethylene resins, polyether resins, polycarbonate resins, polysulfone resins, polystyrene resins, polyethylene chloride resins, polypropylene chloride resins, vinyl acetate resins, vinyl chloride resins, chlorinated vinyl chloride resins, vinylidene chloride resins, fluorine resins, polypropylene resins, etc.; powders of copolymers of these resins (e.g., a vinylidene/vinyl chloride copolymer, styrene/acrylic copolymer).

The use of the cored filler and the foregoing synthetic resin powder together is particularly effective in the case of coating the coating composition on a steel plate, a plate of another metal, or a synthetic resin plate, and drying by heating.

In the case of normal temperature drying, the dried coated film is high density and hence a filler having high density, such as a hydraulic inorganic filler, etc., is not so required but in the case of drying by heating, by reducing the compounding ratio of high-density filler, blistering of the surface coated film occurs at heating. The problems occurring in the case of drying by heating or increasing the thickness of the coated layer can be effectively prevented by combining the syntactic foam and the synthetic resin powder although the reason these problems do not occur is not clear.

Other fillers which can be used for the coating composition of the present invention are fillers other than the hydraulic inorganic filler described above, and examples of such other fillers are calcium carbonate, talc, silica sand, clay, a kiln ash (which is composed of, for example, 26 wt % of $SiO_2$, 22 wt % of $Al_2O_3$, 15 wt % of $Fe_2O_3$, 9.5 wt % of $P_2O_5$, 6.3 wt % of $TiO_2$, 2.1 wt % of $MgO$, 19.1 wt % of the rest), red oxide ($Fe_2O_3$), cellulose fibers, plastic fibers, asbestos, mica, pumice, and vermiculite.

Such other filler has an effect of controlling the uniformity, the vibration damping properties, the heat resistance, etc., of the coated film and the effect is more improved by using such a filler together with the foregoing hydraulic inorganic filler.

The particle sizes of the foregoing hydraulic inorganic filler, the other filler and the synthetic resin powder are adjusted to about 1 to 300 $\mu$m, and preferably less than about 10 to 150 $\mu$m by ordinary method at use.

If the particle sizes thereof are larger than about 300 $\mu$m, it becomes difficult to obtain the desired vibration damping properties and the stability and workability of the coating composition are deteriorated.

Further, the coating composition of the present invention can be colored by incorporating therein a pigment.

Practical examples of the pigment are inorganic pigments such as titanium oxide, cadmium sulfide, iron oxide, and chromium oxide,; and organic pigments such as copper phthalocyanine blue, and condensed polyazo yellow. The mixing ratio of the pigment is from about 0.1 to 5% parts by weight per 100 parts by weight of the binder.

As the fibrous material which can be used for the coating composition of the present invention, there are natural fibers such as wool, cotton, hemp, and asbestos; regenerated fibers such as viscose artificial fibers, regenerated cellulose fibers, and soybean protein artificial fibers; semi-synthetic fibers such as acetate fibers; synthetic fibers such as polyvinyl alcohol synthetic fibers, polyethylene fibers, nylon fibers, and polyester fibers; and inorganic fibers such as glass fibers. However, in these fibrous materials, synthetic fibers are preferred and polyvinyl alcohol synthetic fibers are more preferred from the viewpoints of easily availability, low cost, a low specific gravity (1.2–1.3) useful for reducing the weight of the coating composition, and the excellent chemical resistance and weather resistance of the fibers themselves. The fibrous material is effective to enhance evaporation of water contents by capillary of the fibers themselves.

The diameter of the fibrous material is from about 5 to 15 $\mu$m, preferably from about 8 to 11 $\mu$m, and the fiber length thereof is from about 0.1 to 10 mm, preferably from about 1 to 5 mm. If the fiber diameter and the fiber length are less than the foregoing ranges, the effect of increasing the evaporation speed of the water in the coated film cannot be expected and, also, if the fiber diameter and the fiber length are larger than the foregoing ranges, the workability and spraying property of the coating composition is reduced.

As the gas which can be used for the coating composition of the present invention, any stable gas (e. g., air, $CO_2$ $N_2$, He) having low reactivity can be used. For example, there are air and carbon dioxide which are intermixed with the coating composition by stirring at the preparation of the coating composition and a gas released from a commercially available foaming agent (e.g., sodium bicarbonate, ammonium carbonate), etc., by a secondary action. For reducing the cost for the coating composition, intermixing of air or carbon dioxide by stirring in the case of preparing the coating composition is most effective.

The method of intermixing the gas into the coating composition may be a method of intermixing the gas at the preparation of the coating composition or may be a method of carrying out a defoaming treatment (e.g., by reduced pressure) during the preparation of the coating composition and then intermixing a necessary amount of the gas by using a stirrer, a coating machine, or a spray nozzle.

It is desirable that intermixing of the gas be carried out directly before the use of the coating composition.

The mixing ratios of the foregoing components are as follows.

The mixing ratio of the hydraulic inorganic filler is from about 20 to 200 parts by weight, and preferably from about 30 to 140 parts by weight, per about 100 parts by weight of the binder.

If the mixing ratio of the hydraulic inorganic filler is less than about 20 parts by weight, sagging of the coating composition at coating occurs and the drying rate of the coated film is reduced, while if the mixing ratio thereof is over about 200 parts by weight, adhesion of the coated film to a substrate is deteriorated and cracks occur in the coated film.

The mixing ratio of the filler other than the hydraulic inorganic filler is from about 10 to 150 parts by weight, and preferably from about 20 to 80 parts by weight, per about 100 parts by weight of the binder.

If the mixing ratio of the other filler is less than about 10 parts by weight, the uniformity of the coated film is lowered, while if the mixing ratio thereof is over about 150 parts by weight, adhesion of the coated film to a substrate and workability of the coating composition become inferior since the mixing ratios of the binder and the hydraulic inorganic filler are reduced.

Also, the compounding ratio of the hydraulic inorganic filler and the other filler is a very important factor which affects the hydraulic property of the hydraulic inorganic filler, when 20 to 200 parts by weight, and preferably about 30 to 140 parts by weight of the hydraulic inorganic filler is used, it is about 10 to 150 parts by weight, preferably about 20 to 80 parts by weight of the other filler. The ratio of the hydraulic inorganic filler/the other filler is 5/1 to $\frac{1}{2}$, preferably 3/1 to 1/1. If the ratio of the other filler is above the foregoing range, the storage stability of the coating composition of the present invention becomes inferior and the viscosity of the coating composition is also increased to lower workability. If the ratio of the other filler is less than the foregoing range, the hydraulic property of the coating composition is too high and hence the coating composition is gradually solidified, whereby the storage stability of the coating composition is lowered.

The amount of the cored filler used for the coating composition of the present invention is from about 5 to 70 parts by weight, and preferably from 10 to 50 parts by weight, per about 100 parts by weight of the binder.

When the cored filler is added together with the hydraulic inorganic filler, when at least 20 parts by weight of the hydraulic inorganic filler is used, the vibration damping properties of the coated film are increased (even in the use of the syntactic foam) by any synergistic effect with the cored filler.

Further, since the weight of the cored filler is low as compared with the hydraulic inorganic filler, by using the hydraulic inorganic filler together with the cored filler, the weight of the coating composition of the present invention can be decreased. In this case, however, if the content of the hydraulic inorganic filler is over about 200 parts by weight, the desired light weight of the coating is not attained.

In the case of using the cored filler and the synthetic resin powder together, the total amount of both is from about 5 to 70 parts by weight to 100 parts by weight of the binder. In the preferred mixing ratio thereof, the ratio of cored filler/synthetic resin powder is in the range of from about 1/0.5 to $\frac{1}{3}$ (by volume ratio).

If the amount of the cored filler or the total amount of the cored filler and the synthetic resin powder is less than about 10 parts by weight per 100 parts by weight of the binder, the vibration damping properties of the coated film and the effect of lightening weight of the coating composition cannot be attained, while if the amount or the total amount is over about 70 parts by weight, the viscosity of the coating composition of the present invention is increased to cause problems in coating.

In the mixing ratio of the cored filler to the synthetic resin powder, if the ratio of the cored filler is higher than about 1/0.5 (by volume), the viscosity of the coating composition is increased to reduce the working efficiency in coating, while if the ratio of the cored filler is less than $\frac{1}{3}$ (by volume), a sufficiently light weight of the coating composition cannot be attained.

The compounding amount of the fibrous material is from about 0.1 to 1.5% by weight, and is preferably from about 0.2 to 1.0% by weight, based on the total weight of the coating composition of this invention.

If the compounding amount of the fibrous material is above the foregoing range, the fibrous material will be twined around stirring blades at kneading the fibrous material together with the binder and the fillers, which makes the production of the coating composition very difficult.

Further, the fibrous material shows sufficient effects when the fibrous material is added to the binder as in the case of adding another filler(s) or if the fibrous material is added to the binder as a previously formed mixture thereof with another filler(s) at the production of the coating composition of the present invention.

The mixing amount of the gas in this invention is from about 1 to 50% by volume, preferably from about 5 to 40% by volume, and more preferably from about 20 to 40% by volume, based on the total volume of the coating composition.

If the mixing amount of the gas is less than about 1% by volume, the mixing effect of the gas is not obtained, while if the mixing amount of the gas is more than about 50% by volume, the mixing effect of the gas does not provide any further additional benefits. Also, mixing such a large amount of gas (over 50% by volume) requires a very long time with a mixing method such as stirring, which results in a deterioration of the quality of the coating composition.

The coating composition of the present invention described above desirably has the following properties: the content of volatile matter is from about 15 to 40% by total weight of the coating composition (over 90% of the volatile matter is water), the viscosity is from about 10,000 to 100,000 (B type viscometer, 20° C., rotation speed 3 r.p.m.), and the specific gravity is in the range of from about 0.5 to 1.5. The coating composition can provide a coated film having any desired thickness by any known optional method such as press spraying and airless spraying.

In addition, at the production of the foregoing coating composition, the viscosity thereof is in principle adjusted with water but also may be adjusted using an organic solvent. In this case, various kinds of conventional additives such as a viscosity controlling agent, and an antifreezing agent, may be added to the coating composition.

The water content or organic solvent is from 15 to 40 wt % and the coating components is from 60 to 85 wt % in the total amount of the coating composition.

By coating the coating composition on a substrate at a thickness of from about 0.5 to 10 mm, preferably from about 1 to 5 mm, and more preferably from about 2 to 4 mm, and drying the coated film by heating to a temperature of from room temperature to 180° C., preferably from about 110° to 170° C. in air, a good coated film is obtained in a short time (about 5–60 minutes, preferably about 10–30 minutes) and the substrate has excellent vibration damping properties due to the coated film.

Even when the drying temperature of the coated film is at a high temperature to some extent, the temperature of the coated film is kept at a temperature of from about 100° to 120° C. by the latent heat of evaporation of water or the organic solvent in the coated film and a good coated film is obtained. However, when the drying temperature becomes higher than about 180° C., film formation at the surface of the coated film becomes predominant, the coated film is blistered by the expansion of water or organic solvent confined in the coated film, and thus there is the tendency of cracking, etc. Thus, a drying temperature of higher than about 180° C. is undesirable.

In addition, with drying conditions where the drying air flow rate is less than 1 meter/second, the gas and the fibrous material in the coating composition does not have much influence, but when the drying air flow rate is about 1 to 10 meter/second, especially about 3 to 6 m/sec. at drying, a coated film formed by the coating composition containing no gas has the possibility of blistering. This is also applied to the case of using a far infrared ray lamp, an infrared ray lamp, etc., which can supply with heat. Accordingly, under such severe drying conditions, it is preferred to use a coating composition containing the gas and/or the fibrous material.

The following examples are intended to illustrate the present invention more practically but not to limit it in any way.

EXAMPLES 1 TO 4 AND COMPARISON EXAMPLES 1 TO 3

The compounding ratios of the coating compositions of the present invention and the coating compositions of the comparison examples are shown in the following Table 1, where the compounding ratios are all shown by weight parts.

In each example of the present invention and each comparison example, after emulsifying each vehicle by adding 100 parts by weight of water, definite amounts of each hydraulic inorganic filler, etc., were added to the emulsion and, further, an antifreezing agent, a viscosity controlling agent, etc., were added to the mixture to provide each coating composition.

For each of the coating compositions obtained in Examples 1 to 4 and Comparison Examples 1 to 3, the workability, the adhesion, the light weight ratio, and the logarithmic damping ratio (vibration damping property) were tested and the results obtained are shown in Table 2.

The evaluation of the workability was carried out according to the motor car test JASO M306-70 and the coating composition which could be smoothly coated by an air spray gun with no dripping of the coated film was evaluated as "passing".

The evaluation of adhesion was carried out as follows. First, each sample was coated on a substrate (electro-deposited (180° C.×15 min.) steel plate of 0.8 mm × 300 mm × 300 mm) and dried at room temperature (25° C.) or at 150° C. for 30 minutes using flowing air at a speed of 0.65 meter/second to provide each test piece having a coated layer of a dry thickness of 3.0 mm. As a result of the observation of the external appearance of the coated film, a coated film having neither blistering nor cracking at the surface thereof and which was uniformly adhered to the steel plate was evaluated as "passing".

The light weight ratio was evaluated as follows. First, on the test piece used in the above test, the weight of the steel plate was measured and after coating each sample on the steel plate, the weight thereof was measured again. The weight obtained by subtracting the weight of the steel plate from the weight of the coated sample was used as the sample weight. The light weight ratio was then obtained using the following equation.

Light weight ration (%)=(A-B)/A×100

A: Sample weight of Comparison Example 1
B: Sample weight of the subject sample

The logarithmic damping ratio was evaluated as follows. First, each sample was coated on a substrate (electro-deposited ( 180° C.×10 min. ) iron plate of 0.8 mm×25 mm×200 mm) dried at room temperature (25° C.) or at 150° C. for 30 minutes to provide each test piece having the coated film at a dry thickness of 2.5 mm. The test piece was set in a non-contact type electromagnetic vibration apparatus, and from the damping wave form after applying vibration, the logarithmic damping ratio was measured.

In addition, since the sample of Comparison Example 3 was not a "passing" sample in adhesion, the measurement of this test was not carried out.

TABLE 1

|  | E-1 | E-2 | E-3 | E-4 | C-1 | C-2 | C-3 |
|---|---|---|---|---|---|---|---|
| Binder |
| Straight Asphalt | 70 | 50 | 35 | 75 | 90 | 90 | 75 |
| Natural Asphalt |  | 15 | 30 | 15 |  | 5 |  |
| Acrylic Resin | 50 | 25 | 35 |  | 20 |  | 65 |
| Urethane Resin | 20 |  |  |  |  |  |  |
| Styrene-Vinyl Acetate Resin |  |  |  | 35 |  | 25 |  |
| Stzrene-Butadiene Rubber |  |  |  |  | 10 |  | 10 |
| Hydraulic Inorganic Filler |
| Aging Slag | 70 | 40 | 80 | 70 | 110 | 150 | 50 |
| Portland Cement |  | 10 |  |  | 10 | 15 |  |
| Gypsum |  |  |  | 10 |  |  |  |
| Cored filler |
| Glass Balloon | 20 | 10 | 10 | 10 |  |  | 150 |
| Resin Balloon | 20 |  |  |  |  |  |  |
| Synthetic Resin Powder |
| Polyester |  | 30 |  | 10 |  |  |  |
| Vinylidene/vinyl Chloride Copolymer |  |  | 40 | 20 |  |  |  |
| Other Filler |
| Calcium Carbonate | 30 | 10 | 30 |  | 30 |  |  |
| Talc |  | 5 |  |  | 30 |  |  |
| Kiln Ash | 10 |  |  | 10 |  | 30 |  |
| Kaolin |  | 5 |  |  | 20 | 60 |  |

E: Example of this invention;
C: Comparison Example

TABLE 2

|  | Drying Temp. | Workability | Adhesion | Light-Weight Ratio | Logarithmic Damping Ratio |
|---|---|---|---|---|---|
| Example 1 | N.T. | Pass. | Pass. | 25 | 0.28 |
| Example 2 | 150° C. | Pass. | Pass. | 30 | 0.27 |
| Example 3 | 150° C. | Pass. | Pass. | 30 | 0.26 |
| Example 4 | 150° C. | Pass. | Pass. | 35 | 0.26 |
| Comparison Example 1 | 150° C. | Pass. | Pass. | Base | 0.26 |
| Comparison Example 2 | 150° C. | Pass. | Pass. | 0 | 0.27 |
| Comparison Example 3 | N.T. | N.G. | N.G. | 50 | — |

N.T.: Normal Temperature
N.G.: No Good (not passing)

EXAMPLES 5 TO 7 AND COMPARISON EXAMPLE 4

Coating compositions having the composition shown in Table 3 were prepared. The coating method was carried out according to JASO M306-70. The properties of these coating compositions are shown in Table 4, the results of measuring the water evaporation ratios are shown in Table 5, and the results of measuring the vibration damping properties thereof are shown in Table The water evaporation rate was evaluated as follows. Each coating composition was coated at a thickness of 3 mm and the evaporation rate was calculated using the following equation from the actually measured value of the loss after drying when the coated film was dried in a dryer at 150° C. at an average air flow rate of from 3 to 4 meters/second and the theoretical evaporation amount. The appearance of the dried coated film was observed by the naked eye.

Evaporation ratio = (C)/(D) × 100 (%)

(C): Actually Measured Value, i.e., the value obtained by measuring the weight of the coated film every 5 minutes in the dryer at 150° C.

(D): Theoretical Evaporation Amount, i.e., the coated film was dried for one hour in the dryer at 150° C. and the amount of water evaporated was calculated from the loss after drying.

The damping ratio was evaluated as follows. Each coating composition was coated on a substrate (iron plate of 0.8 mm×25 mm×200 mm) at a thickness of 3 mm and dried for 30 minutes in a dryer at 150° C. to provide a test piece. The loss coefficient (logarithmic damping ratio) obtained by measuring the mechanical impedance of each test piece by a central vibration method was compared.

TABLE 3

|  | Examples | | | Comparison |
| --- | --- | --- | --- | --- |
|  | 5 | 6 | 7 | Example 4 |
| Asphalt | 35 | 35 | 35 | 35 |
| Natural Asphalt | 32 | 32 | 32 | 32 |
| Acrylic Resin | 33 | 33 | 33 | 33 |
| Aging Slag | 84 | 84 | 84 | 84 |
| Calcium Carbonate | 38 | 38 | 38 | 38 |
| Glass Balloon*1 | 12 | 12 | 12 | 12 |
| Vinylidene/vinyl Chloride Copolymer Powder*2 | 38 | 38 | 38 | 38 |
| Polyvinyl Alcohol Synthetic Fibers*3 | 0.7 | — | — | — |
| Nylon Fibers | — | 0.20 | — | — |
| Wool | — | — | 0.20 | — |
| Others*4 | 10 | 10 | 10 | 10 |

*1: Bulk density 0.23 g/cm³, particle size 20 to 149 μm.
*2: Particle size 25 to 30 μm.
*3: Diameter 11 μm, fiber length 1.0 mm.
*4: Antifreezing agent (about 1.0 wt %), Lust inhibitor (about 0.1 wt %), Mildew-proofing agent (about 1 wt %)

TABLE 4

|  | Examples | | | Comparison |
| --- | --- | --- | --- | --- |
|  | 5 | 6 | 7 | Example 4 |
| Volatile Matter (weight %) | 25.4 | 25.0 | 25.3 | 25.8 |
| Viscosity (c.p.)*5 | 75.9 | 76.3 | 76.8 | 70.0 |
| Specific Gravity | 1.24 | 1.25 | 1.22 | 1.25 |

*5: measured using B-type viscometer, 20° C., at a rotation speed of 3 r.p.m.

TABLE 5

| Passed Time (minute) | Evaporation Ratio | | | |
| --- | --- | --- | --- | --- |
|  | Example 5 | Example 6 | Example 7 | Comparison Example 4 |
| 5 | 38.2 | 35.0 | 34.5 | 32.0 |
| 10 | 93.8 | 89.6 | 90.4 | 60.5 |
| 15 | 95.2 | 91.3 | 92.5 | 85.5 |
| 20 | 95.8 | 93.8 | 95.0 | 95.2 |
| 25 | 96.6 | 96.0 | 9.65 | 97.4 |
| 30 | 96.8 | 96.6 | 96.7 | 98.3 |
| Appearance of Dry Coated Film | Normal | Normal | Normal | Blistered |

As is clear from the results shown in Table 5, in Examples 5 to 7 of this invention, the evaporation rate (evaporation ratio) is very high as compared with the comparison examples, i.e., in the examples of this invention, the evaporation rate is less than 10 minutes, while in Comparison Example 4, the evaporation rate is 20 minutes.

With respect to the appearance of the coated films, in the case of the comparison example, blistering occurred and cracks on the surface were observed, i.e., a good coated film was not formed, while in the examples of this invention, such problems were not observed and the finish of each coated film was good. In Comparison Example 4, however, blistering occurred in the conditions employed in the above experiment but with drying conditions where the air flow velocity was less than 1 meter/second, blistering did not occur and a good coated film was obtained.

TABLE 6

|  | Examples | | | Comparison |
| --- | --- | --- | --- | --- |
|  | 5 | 6 | 7 | Example 4 |
| Logarithmic Damping Ratio | 0.57 | 0.57 | 0.57 | <0.1 |

EXAMPLES 8 TO 10 AND COMPARISON EXAMPLES 5 AND 6

Coating compositions each having the composition shown in Table 7 below were prepared. The coating method was carried out according to JASO M306-70. The water evaporation rates of these coating compositions are shown in Table. 8 and the comparison results of the damping properties thereof are shown in Table 9.

The water evaporation rate (evaporation ratio) is the actually measured value of the loss after drying when the coated film formed by coating each coating composition at the thickness shown in Table 7 is dried in a dryer at 120° C. at an air flow rate of from 3 to 4 meters/sec. The appearance of the dried coated film was observed by the naked eye.

Comparison of the damping properties of the coated films was carried out as follows.

Each coating composition was coated on a substrate (iron plate of 0.8 mm×25 mm×200 mm) and dried for 30 minutes in a dryer at 150° C. to provide each test piece. The loss coefficient (logarithmic damping ratio) obtained by measuring the mechanical impedance of the test piece by a central vibration method was then compared. Each coating composition has a different gas mixing ratio and the value of the apparent specific gravity is different in each coating composition. Thus, the weight of each coating composition coated on the substrate differs. Thus, in the test, each costing composition was coated on the base plate at a constant weight.

The gas (air) intermixing was conducted by stirring for about 10 minutes using stirrer.

TABLE 7

|  | Example | | | Comparison | |
| --- | --- | --- | --- | --- | --- |
|  | 8 | 9 | 10 | 5 | 6 |
| Binder |  |  |  |  |  |
| Asphalt | 75 | 75 | 75 | 75 | 75 |
| Acrylic Resin | 73 | 73 | 73 | 73 | 73 |
| Natural Asphalt | 52 | 52 | 52 | 52 | 52 |
| Hydraulic Inorganic Filler |  |  |  |  |  |
| Aging Slag Cored Filler | 138 | 138 | 138 | 138 | 138 |
| Glass Balloon Synthetic Resin Powder | 18 | 18 | 18 | 18 | 18 |
| Vinylidene/Vinyl Chloride Copolymer | 64 | 64 | 64 | 64 | 64 |
| Other Filler |  |  |  |  |  |

TABLE 7-continued

|  | Example | | | Comparison | |
|---|---|---|---|---|---|
|  | 8 | 9 | 10 | 5 | 6 |
| Calcium Carbonate | 56 | 56 | 56 | 56 | 56 |
| Film Thickness (mm) | 3.0 | 3.0 | 3.0 | 3.0 | 2.0 |
| Gas (Air) Intermixing Ratio (volume %) | 30 | 15 | 8 | 0.0 | 0.0 |

TABLE 8

| | Evaporation Ratio | | | | |
|---|---|---|---|---|---|
| Passed Time | Examples | | | Comparison Examples | |
| (minute) | 8 | 9 | 10 | 5 | 6 |
| 10 | 60 | 44 | 37 | Blistered | Blistered |
| 20 | 97 | 67 | 52 | Blistered | Blistered |
| 30 | 99 | 96 | 89 | Blistered | Blistered |
| Appearance of Dry Coated Film | Normal | Normal | Normal | Blistered | Blistered |

As is clear from the results shown in Table 8, with an increase of the mixing ratio of the gas, the evaporation rate tended to increase. With respect to the appearance of the dried coated film, the occurrence of swelling was observed in the comparison examples where the mixing ratio of the gas is 0, but in the examples of the present invention, where the gas was intermixed, good coated films were obtained.

TABLE 9

|  | Examples | | Comparison |
|---|---|---|---|
|  | 8 | 9 | Example 5 |
| Logarithmic | 0.57 | 0.57 | <0.1 |
| Damping Ratio | | | |

As is clear from the results shown in Table 9, in the cases of the examples of the present invention, good dried coated films having a good vibration damping property are obtained at a high temperature range of higher than about 100° C.

EXAMPLES 11 TO 19 AND COMPARISON EXAMPLE 7

Coating compositions each having the formula shown in Table 10 were prepared. The coating method was carried out according to JASO M306-70. The water evaporation rates of the coated films of the coating compositions are shown in Table 11 below.

In addition, the water evaporation rate (evaporation ratio) was calculated in the same manner as in Examples 5 to 7, and the appearance of the dried coated films were observed as in Examples 5 to 7.

TABLE 10

| | Examples | | | | | | | | | (parts by weight) Comparison |
|---|---|---|---|---|---|---|---|---|---|---|
| | 11 | 12 | 13 | 14 | 15 | 16 | 17 | 18 | 19 | Example 7 |
| Binder | | | | | | | | | | |
| Asphalt | 75 | 75 | 75 | 75 | 70 | 50 | 90 | 90 | 75 | 75 |
| Natural Asphalt | 75 | 75 | 75 | | | 15 | | 5 | 52 | 75 |
| Acrylic Resin | 50 | 50 | 50 | 65 | 50 | 15 | 20 | | 72 | 50 |
| Urethane Resin | | | | | 20 | | 10 | | | |
| Styrend-Butadiene Rubber | | | | 10 | | | | | | |
| Styrene-Vinyl Acetate Resin | | | | | | | | 25 | | |
| Hydraulic Inorganic Filler | | | | | | | | | | |
| Aging Slag | 125 | 125 | 125 | 50 | 70 | 40 | 110 | 150 | 138 | 125 |
| Portland Cement | | | | | | 10 | 10 | 15 | | |
| Gypsum | | | | | | 10 | | | | |
| Cored Filler | | | | | | | | | | |
| Glass Balloon | 25 | 25 | 25 | 50 | 20 | 30 | | 18 | 25 | |
| Resin Balloon | | | | | 20 | | | | | |
| Synthetic Resin Powder | | | | | | | | | | |
| Vinylidene-Vinyl Chloride | 50 | 50 | 50 | | | 30 | | | 64 | 50 |
| Other Filler | | | | | | | | | | |
| Calcium Carbonate | 40 | 40 | 40 | | 30 | 10 | 30 | | 56 | 40 |
| Talc | | | | | | | 5 | 30 | | |
| Kiln Ash | | | | | 10 | | | 30 | | |
| Kaoline | | | | | | 5 | | 30 | | |
| Gas (Air) Mixing Ratio (vol %) | 40 | 30 | 20 | 20 | 20 | 20 | 20 | 20 | 20 | 0 |

TABLE 11

| | Evaporation Ratio | | | | | | | | | |
|---|---|---|---|---|---|---|---|---|---|---|
| Passed Time | Examples | | | | | | | | | Comparison |
| (minute) | 11 | 12 | 13 | 14 | 15 | 16 | 17 | 18 | 19 | Example 7 |
| 10 | 95 | 94 | 83 | 44 | 44 | 43 | 43 | 44 | 44 | Blistered |
| 20 | 100 | 98 | 92 | 68 | 68 | 69 | 69 | 67 | 67 | " |
| 30 | 100 | 100 | 95 | 97 | 97 | 95 | 96 | 96 | 96 | " |
| Appearance of Dry Coated Film | Normal | Normal | Normal | Normal | Normal | Normal | Normal | Normal | Normal | " |

As is clear from the results shown in Table 11, even in the case of increasing the drying temperature, with an increase of the intermixing amount of the gas, the evaporation rate of water is increased. Also, in a high temperature range of higher than about 150° C., when the intermixing ratio of the gas is increased, blistering does not occur.

With some optional coating composition in the foregoing coating compositions of the examples of the present invention and the comparison examples, the properties shown in Table 12 were measured and the results obtained are shown in the same table.

TABLE 12

|  | Examples | | Comparison Examples | |
| --- | --- | --- | --- | --- |
|  | 8 | 11 | 5 | 7 |
| Volatile Matter (weight %) | 24.7 | 24.7 | 24.7 | 24.7 |
| Viscosity (c.p.)*6 | 64,000 | 64,000 | 64,000 | 64,000 |
| Apparent Specific Gravity | 1.23 | 1.23 | 1.23 | 1.23 |

*6: Measured using a B-type viscometer at 20° C. and at a rotation speed of 3 r.p.m.

The coating compositions of the present invention have good adhesion to steel plates, etc., of cars, etc., can be coated as a thick film, and are excellent in workability.

Further, the coating compositions of the present invention meet the recent demands for excellent vibration damping properties and a light weight, can be applied to the areas requiring particularly high vibration damping performance, such as steel plates of cars, etc., and hence the industrial value of the coating compositions of the present invention is very high.

Since the fibrous material compounded in the coating composition of the present invention has good water-absorbing capability, the water in the coating composition of this invention can quickly move through the fibrous materials by the capillary effects of the fibrous materials.

Accordingly, the evaporation rate of water or organic solvent in the coating composition of the present invention is very fast and the water in the coating composition can be quickly evaporated at the beginning of drying of a coated film.

It is also considered that when the coating composition of this invention is intermixed with a gas, the intermixed gas expands by heat on drying of the surface of the coated film at the beginning of drying, these portions go away from the coated film, then numerous holes are formed and become cavities, whereby the water under the dried portion of the coated film moves through the cavities to quicken the drying rate of the coated film.

Accordingly, with the coating composition of the present invention, water or organic solvent in the coated film coated on a substrate can be evaporated at the beginning of drying the coated film without being confined therein.

The cavities formed are very fine and, as shown in the foregoing examples, there is no abnormal appearance to the naked eye and a coated film having a smooth and good surface can be obtained.

Even if the foregoing fibrous material is compounded in the coating composition of the present invention, according to the present invention the vibration damping properties of the coated film are not lowered.

Further, since the weight of the fibrous material is light, by using the coating composition of the present invention, a coated film having a low specific gravity can be formed.

By these effects, since in the coating composition of the present invention the specific gravity of the coated film is lowered by using the foregoing light-weight materials, thin-film coating is possible and a coated surface having excellent vibration damping properties can be obtained even under relatively severe drying conditions.

While the invention has been described in detail and with reference to specific embodiments thereof, it will be apparent to one skilled in the art that various changes and modifications can be made therein without departing from the spirit and scope thereof.

What is claimed is:

1. An aqueous coating composition comprising from 20 to 200 parts by weight of a first filler, wherein said first filler is a hydraulic inorganic filler, from 10 to 150 parts by weight of a second filler, wherein said second filler is a filler other than the hydraulic inorganic filler, and from 5 to 70 parts by weight of (a) a cored filler or (b) a cored filler and a synthetic resin powder, all per 100 parts by weight of a binder, wherein the binder is selected from the group consisting of asphalt, a butadiene rubber, an isoprene rubber, a chloroprene rubber, an alkyd resin, an epoxy resin, an acrylic resin, a melamine resin, a urethane resin, a vinyl acetate copolymer resin, and a vinyl chloride resin, and the second filler is selected from the group consisting of calcium carbonate, talc, silica sand, clay, kiln ash, red iron oxide, cellulose fibers and plastic fibers.

2. The aqueous coating composition of claim 1, wherein the amount of the hydraulic inorganic filler is from 30 to 140 parts by weight to 100 parts by weight of the binder.

3. The aqueous coating composition of claim 1, wherein the amount of said other filler is from 20 to 80 parts by weight to 100 parts by weight of the binder.

4. The aqueous coating composition of claim 1, wherein the amount of (a) the cored filler or (b) the cored filler and the synthetic resin powder is from 10 to 50 parts by weight to 100 parts by weight of the binder.

5. The aqueous coating composition of claim 1, wherein the mixing ratio of the cored filler to the synthetic resin powder is from about 1/0.5 to ⅓ by volume ratio.

6. The aqueous coating composition of claim 1, wherein the hydraulic inorganic filler is at least one filler selected from the group consisting of an aging slag, cement, gypsum and lime.

7. The aqueous coating composition of claim 1, wherein the cored filler is at least one cored filler selected from the group consisting of a glass balloon, a Sirus balloon and a synthetic resin balloon.

8. The aqueous coating composition of claim 1, wherein the bulk density of the cored filler is from about 0.1 to 0.3 g/cm³ and the particle size thereof is from 10 to 300 μm.

9. The aqueous coating composition of claim 1, wherein the synthetic resin powder is at least one synthetic resin powder selected from the group of consisting of an alkyd resin, an epoxy resin, a silicone resin, a phenol resin, a polyester resin, an acrylic resin, an acetal resin, a polyethylene resin, a polyether resin, a polycarbonate resin, a polysulfone resin, a polystyrene resin, a vinyl chloride resin, a vinylidene chloride resin, a fluorine resin, and a polypropylene resin; and powders of copolymer resins of the foregoing resins.

10. The aqueous coating composition of claim 1, wherein the particle sizes of the hydraulic inorganic filler, the filler other than the hydraulic inorganic filler and the synthetic resin powder are not larger than 300 μm.

11. An aqueous coating composition comprising from 20 to 200 parts by weight of a first filler, wherein said first filler is a hydraulic inorganic filler, from 10 to 150 parts by weight of a second filler, wherein said second filler is a filler other than the hydraulic inorganic filler, from 5 to 70 parts by weight of (a) a cored filler or (b) a cored filler and a synthetic resin powder, all per 100 parts by weight of a binder, and a fibrous material in an amount of from 0.1 to 1.5 parts by weight based on the total amount of the coating composition, wherein the binder is selected from the group consisting of asphalt, a butadiene rubber, and isoprene rubber, a chloroprene rubber, an alkyd resin, an epoxy resin, an acrylic resin, a melamine resin, a urethane resin, a vinyl acetate copolymer resin, and a vinyl chloride resin, and the second filler is selected from the group consisting of calcium carbonate, talc, silica sand, clay, kiln ash, red iron oxide, cellulose fibers and plastic fibers.

12. The aqueous coating composition of claim 11, wherein the fibrous material is at least one fibrous material selected from the group of consisting of wool, cotton, hemp, asbestos, regenerated cellulose fibers, soybean protein artificial fibers, acetate fibers, vinylon fibers, nylon fibers, polyester fibers, and glass fibers.

13. The aqueous coating composition of claim 11, wherein the diameter of the fibrous material is from about 8 to 11 $\mu$m and the fiber length thereof is from about 1 to 5 mm.

14. The aqueous coating composition of claim 1, wherein a gas is intermixed with the coating composition in an amount of from 1 to 50% by volume based on total volume of the coating composition.

15. The aqueous coating composition of claim 1, wherein a gas is intermixed with the coating composition in an amount of from 5 to 40% by volume based on the total volume of the coating composition.

16. The aqueous coating composition of claim 11, wherein a gas is intermixed with the coating composition in an amount of from 5 to 40% by volume based on the total volume of the coating composition.

* * * * *